United States Patent [19]

Burton

[11] 4,213,383

[45] Jul. 22, 1980

[54] BEAN SNIPPER

[75] Inventor: Charles G. Burton, Lewiston, N.Y.

[73] Assignee: Chisholm-Ryder Company, Inc., Niagara Falls, N.Y.

[21] Appl. No.: 959,250

[22] Filed: Nov. 9, 1978

[51] Int. Cl.$^2$ .............................................. A23N 15/04
[52] U.S. Cl. ............................................ 99/636; 99/644
[58] Field of Search .................... 99/546, 635–637, 99/643, 644; 83/356.1, 356.2, 409.2, 411 R, 418; 366/222, 225, 226, 228, 229

[56] References Cited

U.S. PATENT DOCUMENTS

| | | | |
|---|---|---|---|
| 1,021,426 | 3/1912 | Rowan | 366/222 |
| 1,351,143 | 8/1920 | Vaudreuil | 99/636 |
| 1,990,425 | 2/1935 | Buck | 99/636 |
| 2,114,730 | 4/1938 | Urschel | 99/636 |
| 2,393,461 | 1/1946 | Finley | 99/636 |
| 3,090,602 | 5/1963 | Benton | 366/229 |
| 3,405,750 | 10/1968 | Weirauch | 99/640 |

*Primary Examiner*—Harvey C. Hornsby
*Assistant Examiner*—Timothy F. Simone

*Attorney, Agent, or Firm*—Joseph P. Gastel

[57] ABSTRACT

A bean snipper having an annular drum including openings in the drum of a size to receive beans and to permit only the ends of the beans to protrude outwardly from the outer surface of the drum, knives held in contiguous relationship to the outer surface of the drum for snipping the protruding ends of the beans, an orienter consisting of a plurality of circular discs mounted perpendicularly on a shaft having its axis substantially parallel to the axis of the drum, and a motor for driving the discs and the drum in the same direction, the discs being spaced apart a distance less than the length of the beans and being located in the lower portion of the drum adjacent the downwardly moving side thereof for tending to cause the beans to be oriented with their axes extending perpendicularly to the axis of the drum to thereby increase the probability that the ends of the beans will enter the openings in the drum, and a plurality of parallel annular plates extending inwardly from the inner surface of the drum in substantial alignment with the discs.

18 Claims, 11 Drawing Figures

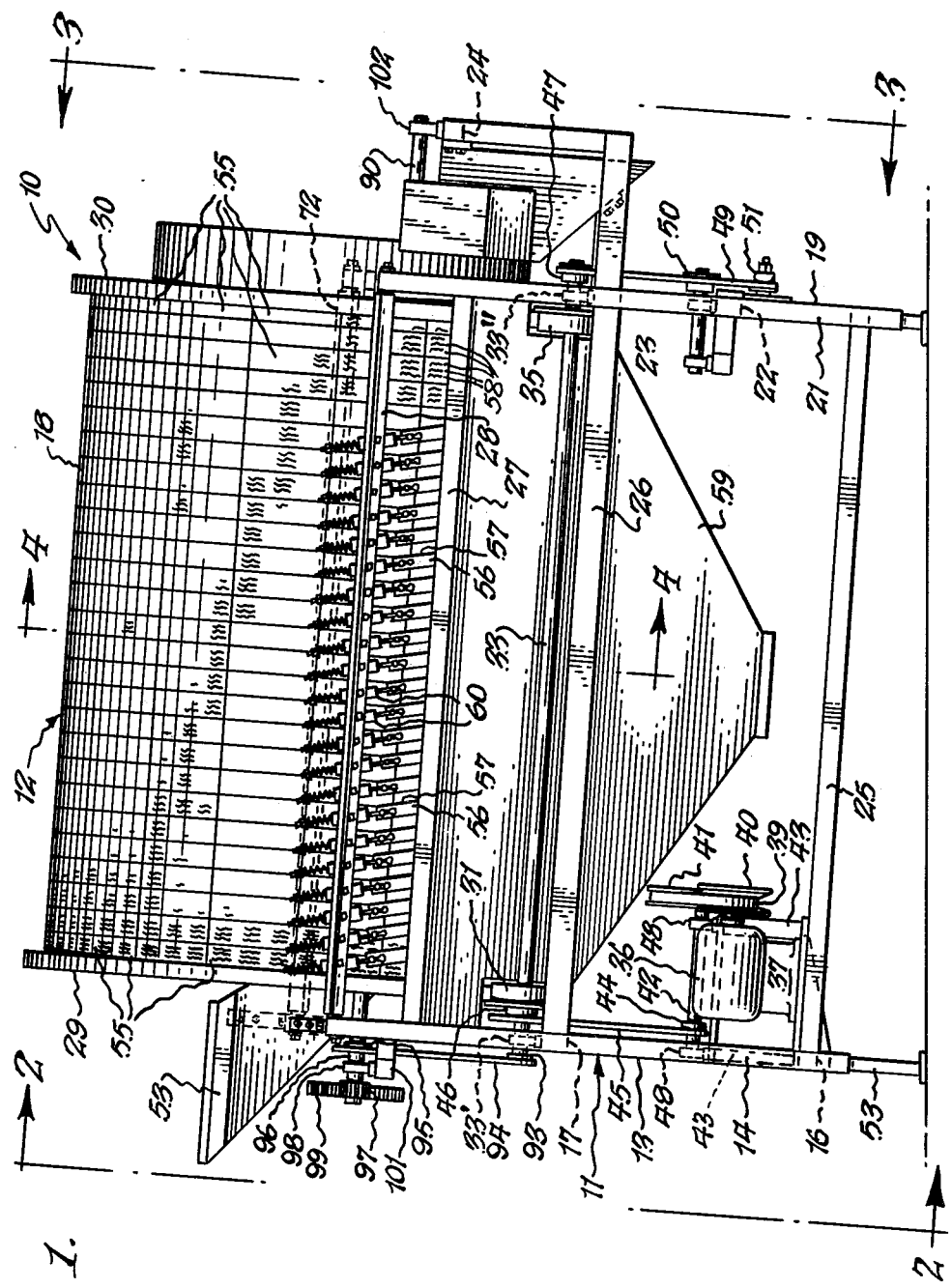

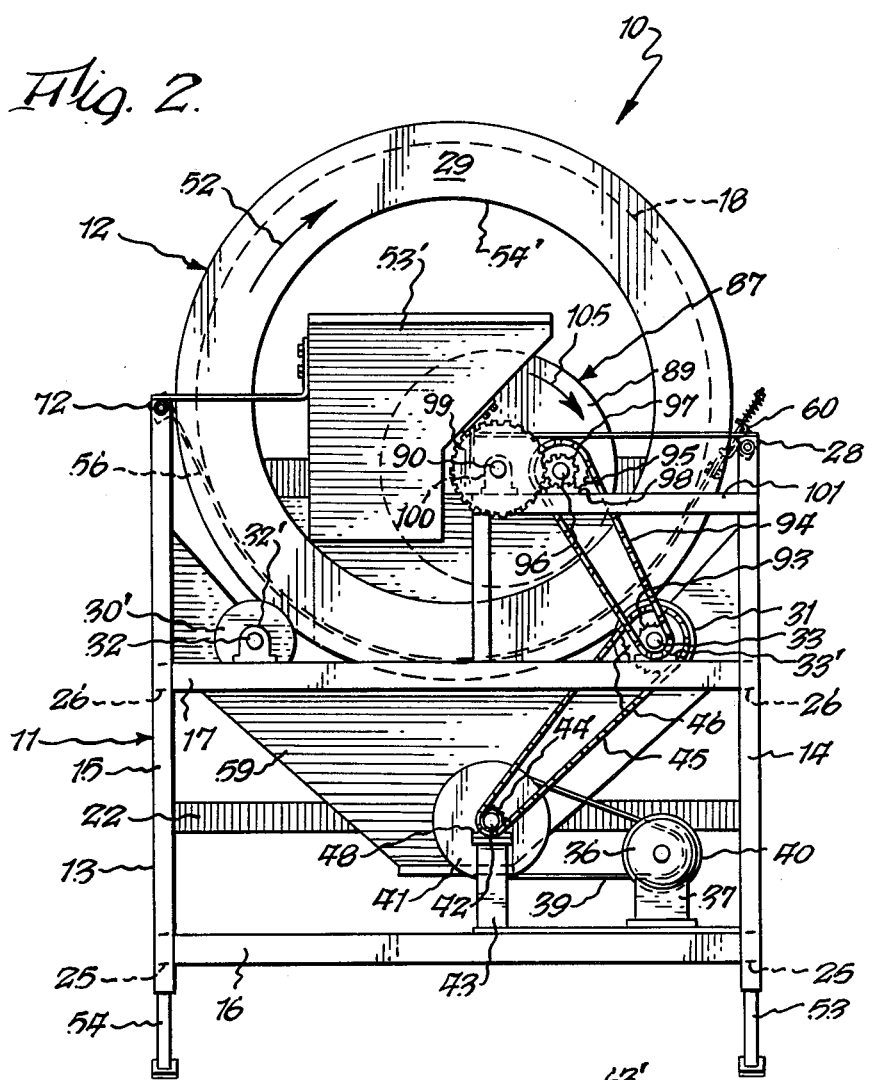
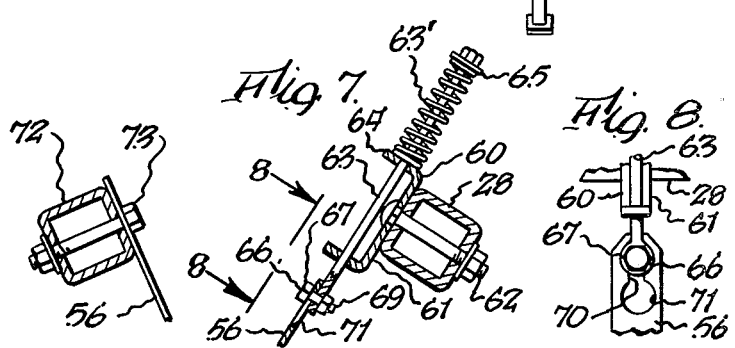

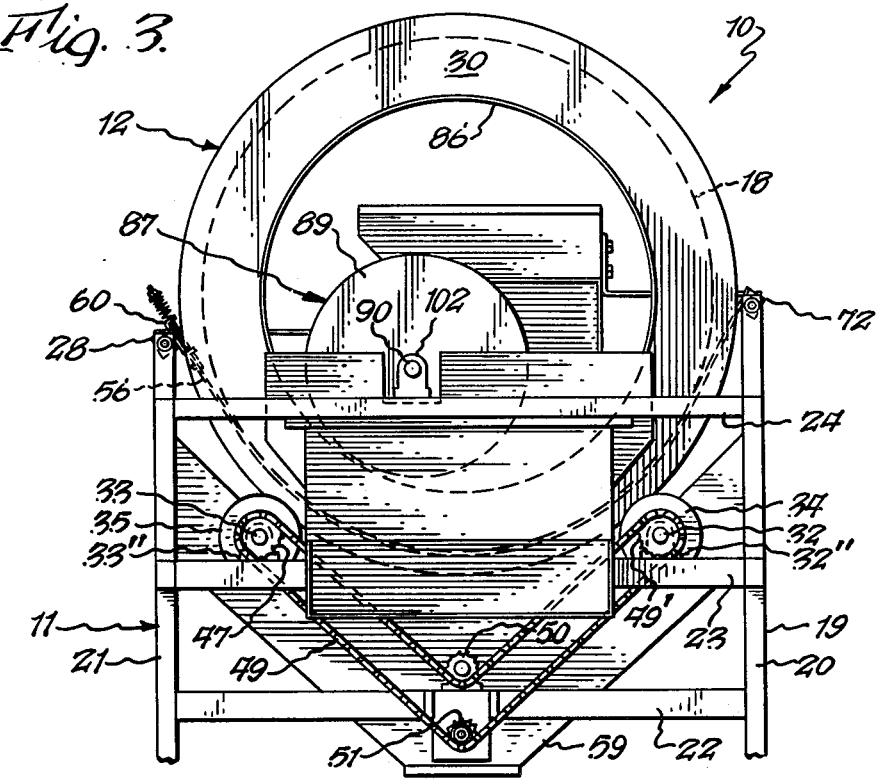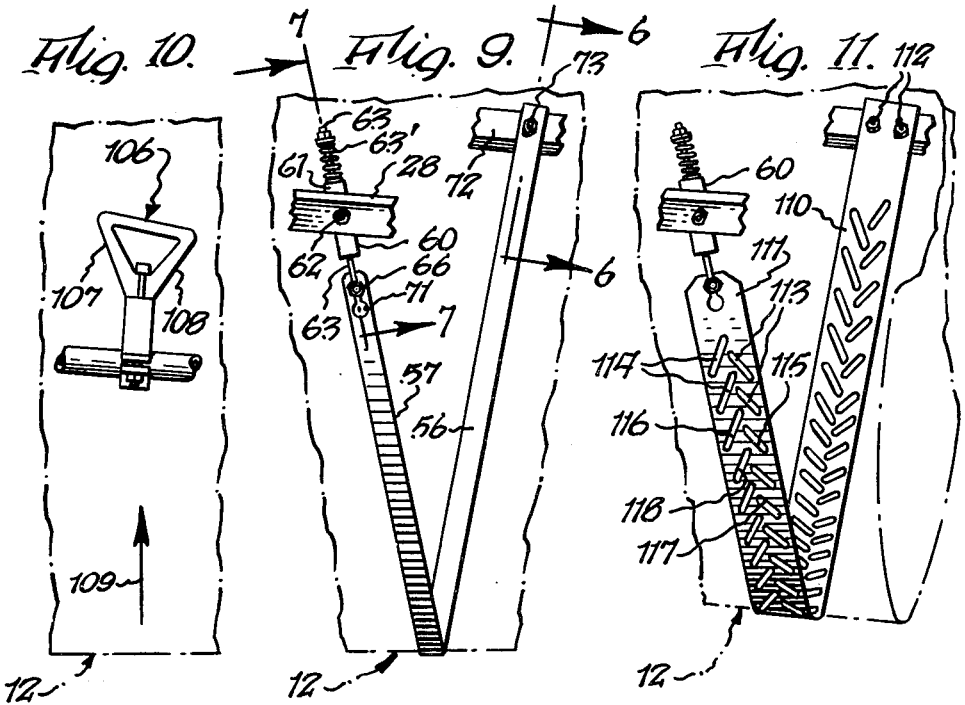

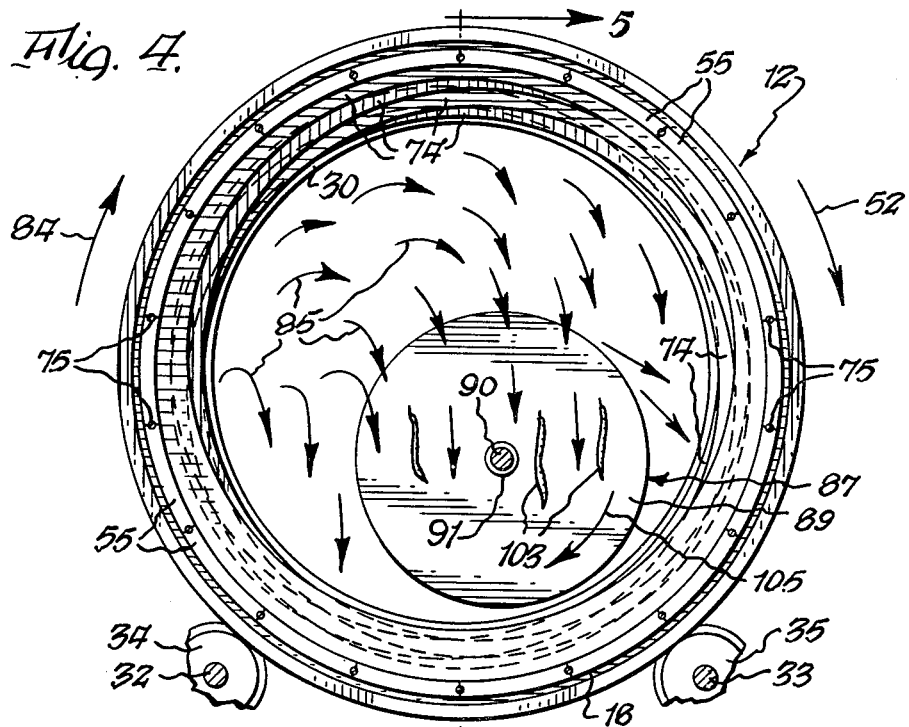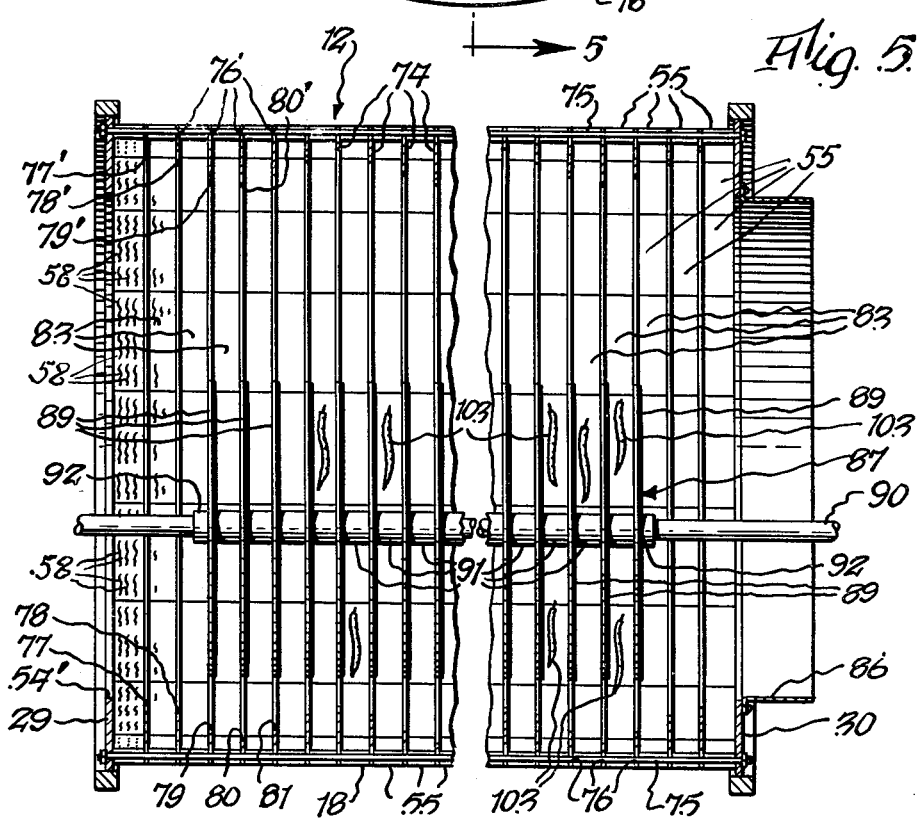

BEAN SNIPPER

BACKGROUND OF THE INVENTION

The present invention relates to an improved bean snipper, and more particularly to an orienter utilized as a part thereof for providing improved snipping efficiency.

By way of background, bean snippers are well known in the art. These devices automatically snip the ends off of snap beans preparatory to further processing thereof. Bean snippers of this type are shown in U.S. Pat. Nos. 2,705,516, 2,979,096, 3,010,498 and 3,378,051. Generally these prior art bean snippers receive beans within a drum which tumbles the beans. The drum has an outer annular wall with bean receiving holes therein which permit only the ends of the beans to protrude outwardly of the drum. These protruding ends are sliced off by knives which are located in contiguous relationship to the outside of the drum.

In prior art bean snippers, as described above, the entry of the ends of beans into the openings in the drum wall was strictly by mathematical probability. There was no structure within the drum for orienting the beans in such a manner so as to increase the mathematical probability of their being received in the openings in the drum wall.

SUMMARY OF THE INVENTION

It is the object of the present invention to provide an orienter in a bean snipper which orients the tumbling beans so that there is a greater probability of the ends thereof entering the openings in the drum wall, thereby producing greater snipping efficiency.

Another object of the present invention is to provide an orienter for a bean snipper which not only orients the beans for easier entry into openings in the drum wall, but also breaks up clumps of beans, thereby futher increasing snipping efficiency.

A still further object of the present invention is to provide a bean snipper having an orienter for causing the tumbling beans to be directed at a greater portion of the inner surface of the wall of a bean snipper, than was heretofore achievable with prior art snippers, thereby still further increasing the snipping efficiency of the snipper.

Yet another object of the present invention is to provide an improved cutting blade construction for a bean snipper. Other objects and attendant advantages of the present invention will readily be perceived hereafter.

The present invention relates to a bean snipper comprising an annular drum having a wall with an inner and outer surface and a longitudinal axis, openings in said wall of a size to receive beans but to permit only the ends of said beans to protrude outwardly from said outer surface, knife means for snipping said protruding ends of said beans, means for mounting said knife means in contiguous relationship to said outer surface, and orienter means in said drum for orienting beans falling toward said openings with their longitudinal axes in a relatively transverse orientation with respect to said longitudinal axis of said drum to thereby tend to cause said ends of said beans to be more likely to be directed toward said openings. In accordance with the present invention, the orienter means also serves the additional functions of breaking up clumps of beans and directing tumbling beans toward a greater portion of the inner surface of the drum than if the orienter was not present.

The present invention also relates to an improved blade construction for a bean snipper comprising an elongated steel band having a first longitudinal axis, and a plurality of elongated cutouts each having a second longitudinal axis extending transversely to said first longitudinal axis, and sharpened edges bordering said longitudinal cutouts. The various aspects of the present invention will be more fully understood when the following portions of the specification are read in conjunction with the accompanying drawings wherein.

BRIEF DESCRIPTION OF THE DRAWINGS

FIG. 1 is a side elevational view of the improved bean snipper of the present invention;

FIG. 2 is an end elevational view, taken in the direction of arrows 2—2 of FIG. 1, and showing the entry end of the bean snipper;

FIG. 3 is an end elevational view, taken in the direction of arrows 3—3 of FIG. 1, and showing the exit end of the bean snipper;

FIG. 4 is a fragmentary cross sectional view taken substantially along line 4—4 of FIG. 1 and showing the action of the orienter located within the drum;

FIG. 5 is a fragmentary cross sectional view taken substantially along line 5—5 of FIG. 4 and showing the orientation between the orienter and the drum in side elevation;

FIG. 6 is a fragmentary enlarged cross sectional view taken substantially along line 6—6 of FIG. 9 and showing how one end of each bean snipping blade is anchored;

FIG. 7 is a fragmentary enlarged cross-sectional view taken along line 7—7 of FIG. 9 and showing the structure for anchoring each opposite end of the blade;

FIG. 8 is a fragmentary view taken in the direction of line 8—8 of FIG. 7;

FIG. 9 is an enlarged fragmentary view showing the orientation of each cutting blade on the machine;

FIG. 10 is a fragmentary side elevational view of another form of knife which can be used; and FIG. 11 is a view similar to FIG. 9 but showing an improved form of cutting knife.

DESCRIPTION OF THE PREFERRED EMBODIMENTS

The improved bean snipper 10 of the present invention includes a frame 11 which supports drum 12 for rotation. Frame 11 includes an inlet frame portion 13 consisting of uprights 14 and 15 connected by cross members 16 and 17. Outlet frame portion 19 consists of uprights 20 and 21 connected by cross frame members 22, 23 and 24. Frame portions 13 and 19 are connected by elongated frame members 25, 26, 27 and 28, on one side of the machine, and by analogous members on the other side of the machine.

Drum 12 includes an annular wall 18 at the ends of which are annular end plates 29 and 30. End plate 29 is rotatably supported on rollers 30' and 31 mounted on shafts 32 and 33, respectively. End plate 30 is supported for rotation on rollers 34 and 35 mounted on shafts 32 and 33, respectively. The ends of shaft 32 are journalled for rotation in bearings 32' and 32" suitably mounted on the frame of the machine. The ends of shaft 33 are journalled for rotation in bearings 33' and 33" suitably mounted on the frame of the machine. A motor 36 is mounted on base 37 supported in part by members 16 and 25. A belt 39 encircles motor pulley 40 and pulley 41 keyed to shaft 42 journalled in bearings 48 mounted on pedestals 43, shaft 42 also having sprocket 44 keyed thereto. A chain 45 encircles sprocket 44 and sprocket 46 keyed to shaft 33. It is in this manner that shaft 33 is driven. The other end of shaft 33 has sprocket 47 keyed thereto and a chain 49 encircles sprocket 47 and sprocket 49' keyed to shaft 32. Idler sprockets 50 and 51 are suitably journalled relative to cross member 22 for guiding chain 49 as shown in FIG. 3. By the foregoing chain and sprocket arrangement shafts 32 and 33 are driven to drive rollers 30, 31, 34 and 35 to cause drum 12 to rotate about its axis in the direction of arrow 52.

Frame portion 13 includes telescoping leg extensions 53 and 54 to frame leg portions 14 and 15, respectively. Frame portion 19 includes similar telescoping leg extensions (not numbered). In this manner the angle of inclination of drum 12 can be adjusted for most efficient operation. It is to be understood that the telescoping portions 53 and 54, and the analogous portions on frame portion 19 are retained in an adjusted position by suitable fasteners (not shown) as is well known in the art.

In the normal operation of prior art machines, beans to be snipped are dumped into entry chute 53' which is suitably supported on the frame of the machine, and the beans are thus guided through opening 54' of end plate 29 into drum 12. The beans drop onto the lowermost portion of wall 18 of drum 12 and are carried upwardly with the part of the drum which is moving upwardly. Thereafter, they will fall as depicted generally by the arrows in FIG. 4. The outside surface of the wall of drum 12 is fabricated with the use of segments 55 having elongated slots 58 therein through which the ends of the beans can protrude but which will prevent the remainder of the beans from passing through the slots. This structure is well known in the art and is shown in detail in U.S. Pat. No. 3,010,498 and is also used in bean snippers shown in U.S. Pat. Nos. 2,979,096 and 3,378,051. As explained in these patents, the segments can be snapped into the frame of the drum, as required. Segments of this general type are also shown in U.S. Pat. No. 2,705,516.

The ends of the beans protruding from the outer surface of the wall of drum 12 are severed by blades 56 mounted on the side of the machine. Blades 56 (FIGS. 1 and 9) comprise elongated bands of steel having a sharpened edge 57 facing the outlet of the machine. As a protruding end of a bean caught in a pocket in a segment 55 passes sharpened edge 57, it will be sliced off and the severed end will drop into chute 59 for disposal. Each blade 56 has one end suspended by spring bracket 60 (FIGS. 1, 7 and 9). In this respect, a bracket body portion 61 is pivotally secured to machine frame member 28 by means of a nut and bolt 62. A pin 63 is slidably received in aligned apertures (not numbered) in body portion 61. A spring 63' is interposed between plate 64 of body portion 61 and washer 65 mounted on pin 63. This will tend to bias pin 63 upwardly in FIG. 7. The lower end of pin 63 carries a bolt 66 having a shank 69 which is received in the narrow portion 70 of keyhole slot 71 of blade 56. Head 67 of bolt 66 prevents the stem 69 from moving out of narrow keyhole slot portion 70. However, if disassembly is required, it can be effected by moving head 67 through the enlarged portion of the keyhole slot. The opposite end of each blade 56 is secured to an elongated frame member 72 (which is analogous to elongated frame member 28) by means of a nut and bolt assembly 73 which extends through a suitable aperture in blade 56. It can thus be seen that each spring 63' will permit each blade 56 to tend to yield in the direction of drum rotation, as depicted by arrow 52. The specific blade structure 56 shown in FIG. 9 does not constitute a part of the present invention by itself, as any suitable blade construction can be used, as will become apparent hereafter. However, the blade of FIG. 11 is considered novel.

The drum 12 is constructed as shown in the above-described patents. However, briefly, it is to be noted that a series of annular plates 74 (FIGS. 4 and 5) are spaced axially of drum 12 and are secured to each other by elongated bolts 75 which extend through suitable holes 76 in the plates. As can be seen from FIG. 4, there are eighteen bolts spaced 20 degrees apart which extend through holes 76. Each annular plate 74 includes a circular opening therein which is eccentrically positioned relative to the plate 74. The plates 74 are aligned in such a manner that the second plate is oriented 60 degrees out of alignment with the first plate so that the openings in the plates are not in alignment. The third plate is oriented 60 degrees out of alignment with the second plate. The fourth plate is oriented 60 degrees out of alignment with the third plate. Thus, considering the view taken on cross section line 5—5 of FIG. 4, as shown in FIG. 5, the inner edge of the firstplate is at 77, the inner edge of the second plate is at 78, the inner edge of the third plate is at 79, the inner edge of the fourth plate is at 80, the inner edge of the fifth plate is at 81, and so on. The opposite edges of each of the plates are shown at 77', 78', 79', 80' and 81', respectively. Thus, the plates will form an undulating pattern within the drum, as generally depicted in FIG. 4. The segments 55 have depressions at their ends by which they are mounted on each of bolts 75 to space the plate 74 as shown in FIG. 5. The spaced plates define annular channels 83. Thus, there are annular channels 83 defined by plates 74, and the inner edges of plates 74 in effect provide an undulating pattern.

As is well explained in prior art U.S. Pat. Nos. 2,705,516, 2,979,096, 3,010,498 and 3,378,051, the bean snipper operates by carrying the beans upwardly with the upwardly moving portion of drum 12, as depicted by arrow 84 in FIG. 4, and these beans will, after reaching a predetermined height, drop downwardly as shown by the various arrows 85. This constant raising and dropping of the beans will cause them to fall, in a random manner, and by probability, certain bean ends will drop through the slots in segments 55 to be snipped. After first ends are snipped, the beans will be thrown out of the slots and eventually the opposite ends will fall into the slots in segments 55 and will be snipped. By the time the beans exit through the opening 86 in plate 30, both ends of most of the beans will be snipped.

However, in the past the snipping was, as described above, a rather random hit and miss proposition because the elongated beans were falling in all possible orientations back onto the lower portion of drum 12. Therefore, while the major portion of the beans which were treated by the prior bean snippers left the machine with both ends snipped, a certain percentage had only one end snipped, and a certain percentage had no ends snipped. The description of the bean snipper to this point, except for any reference made to an orienter and the blade of FIG. 11, is acknowledged by the inventor as constituting prior art.

In accordance with the present invention, an orienter 87 is added to the existing bean snipper for performing a plurality of functions resulting in increased efficiency of the machine and a higher output. The first function is to present the beans to the slots in the segments so that there is a greater probability of the ends of the beans falling into the slots. The second function is to break up any clumps of beans which may exist. The third function is to throw beans over toward the downwardly moving side of the drum so as to expose a greater portion of the inner periphery of the drum wall to falling beans, to thereby capture the ends of more beans for snipping during each rotation of the drum.

The orienter 87 comprises a plurality of circular discs 89 spacedly mounted on shaft 90 by spacers 91. The end discs 89 are secured in position by suitable collars 92 affixed to shaft 90, as by set screws. Discs 89 rotate with shaft 90. In order to impart rotation to shaft 90 and discs 89 mounted thereon, a power take-off is utilized. In this respect, a sprocket 93 is keyed to shaft 33. Sprocket 93 is encircled by chain 94 which also encircles sprocket 95 keyed to stub shaft 96, which also has pinion 97 keyed thereto. Shaft 96 is journalled for rotation in bearing 98 mounted on the machine frame. A gear 99, which is keyed to orienter shaft 90, is in mesh with pinion 97, and is driven thereby. The end of shaft 90 adjacent gear 99 is journalled for rotation in bearing 100 which is mounted on frame member 101 of the frame 11. The opposite end of shaft 90 is journalled for rotation in bearing 102 (FIG. 3) secured to frame member 24. The axis of shaft 90 is substantially parallel to the axis of drum 12. It can readily be seen that drum 12 and orienter 87, because of the foregoing gearing, rotate in the same direction. Preferably, drum 12 is driven at approximately 30 rpm and orienter 87 is driven at approximately 90 rpm.

In operation, the beans which are fed through the machine are of a size which is generally longer than the spaces between drum plates 74. Furthermore, discs 89 of orienter 97 are spaced substantially the same distance apart as are plates 74, and they are substantially in alignment therewith. See FIG. 5. Thus, the elongated beans, such as 103, will tend to pass lengthwise between discs 89, and in so doing, will be oriented with their longitudinal axes substantially transversely to the longitudinal axis of drum 12, whereas previously beans, such as 103, might have fallen onto the inner surface of drum 12, with their axes substantially parallel to the axis of drum 12. This produces a greater probability that more ends of beans will enter the slots in segments 55 than entered such slots with prior constructions not utilizing the orienter 87. In addition, the distribution of beans being dropped by drum 12, as shown in FIG. 4, is that about 50% of the beans will drop downwardly onto orienter 87, approximately 12½% will be to the left of orienter 87, and 12½% to the right of the orienter, all the foregoing being shown in FIG. 4. The remaining 25% of the beans are in a state wherein they are not being oriented because they are being carried with the drum or are otherwise in a position outside of the 75% being oriented, as mentioned above. Furthermore, considering that approximately 50% of the beans in drum 12 are being acted upon by the orienter, it can readily be seen that those falling onto the orienter, in the event they are in clumps, are broken up by the orienter so that they can pass through the spaces between discs 89. In addition to the foregoing, as can be seen from FIG. 4, because discs 89 are rotating in the direction of arrow 105, a certain number of the beans which engage the outer peripheral edges of the discs and also the inner sides of the discs, will be thrown toward the right in FIG. 4 so as to drop onto the portion of drum 52 which is traveling downwardly. Thus, a greater inner peripheral portion of the drum is being bombarded by beans than heretofore in the absence of orienter 87. In other words, the beans would tend to fall on a lower portion of drum 12 than they do as a result of the operation of orienter 87. It has been calculated that by the use of the orienter 87, approximately 140 degrees of drum surface is exposed to falling beans, whereas previously a much lesser surface was so exposed.

In FIG. 10 a modified form of blade construction is shown which can be used on the bean snipper 10 instead of blades 56. This modified form 106 is shown in U.S. Pat. No. 2,979,096 and in U.S. Pat. No. 3,010,498. These patents are incorporated herein by reference, and it is deemed that it is not necessary to make a detailed description of the structure of the knives shown in FIG. 10 other than to indicate that it has edges 107 and 108 which snip off the ends of the beans when the drum travels in the direction of arrow 109. Knives 106 may be mounted as described in detail in U.S. Pat. No. 3,010,498.

An improved form of blade 110 is shown in FIG. 11. This blade is in the form of a band, similar to blade 56 described above relative to FIG. 9. The end 111 of blade 110 is suspended by a bracket 60 which may be identical in all respects to bracket 60 described above relative to FIGS. 7, 8 and 9. The opposite end of blade 110 is affixed by bolts 112 to frame member 72, in the same manner as described above relative to blade 56 and shown in FIG. 6. Blade 110 includes a plurality of first parallel cutouts or openings 113 which extend substantially throughout the length of the blade, as shown. A plurality of second substantially parallel openings 114 also extend substantially throughout the length of the blade. The opposite longitudinal edges of each of the slots 113 and 114 are sharpened to act as cutting edges. Only one edge associated with each slot 113 or 114 is operable at any particular time. In this respect, the lower edges 115 and 116 of slots 113 and 114, respectively, are operable when blade 110 is mounted as shown in FIG. 11. However, if the blade is reversed end-for-end, then edges 117 and 118 will do the cutting. The cutting edges of the slots 113 and 114 will extend at an angle of about 20° to the centerline of the blade 110, and the slots can have a width of at least about ½ inch or wider. In addition, it is to be noted that blade 10 extends exactly circumferentially about a portion of drum 12 in the path of a circle or cylinder, and not in the path of a spiral, like blades 56. In other words, the longitudinal axis of blade 110 lies in a plane which is perpendicular to the axis of drum 12. This is shown schematically in FIG. 11 wherein drum 12 and blade 110 are somewhat in perspective. It will be understood, of course, that a number of blades 110 are used and that they extend parallel to each other.

By way of dimensions, drum 12 has a 56 inch outer diameter, and discs 89 have a 24 inch outer diameter. Furthermore, the centerline of shaft 90 is in a plane approximately 30 degrees to the vertical and passing through the center of drum 12, as shown in FIGS. 2 and 3.

All of the structure of the above-mentioned patents, wherever pertinent to the present subject matter, is incorporated herein by reference, especially the disclosure relating to the structure of the bean-receiving slots 58 in the segments 55 and the structure of knives 106 (FIG. 10) and their related structure.

While preferred embodiments of the present invention have been disclosed, it will be appreciated that the present invention is not limited thereto, but may be otherwise embodied within the scope of the following claims.

What is claimed is:

1. A bean snipper comprising a generally horizontal annular drum having an inner and outer surface and a longitudinal axis, openings in said drum of a size to permit only the ends of the beans to protrude outwardly from said outer surface, knife means for snipping said protruding ends of said beans, means for mounting said knife means in contiguous relationship to said outer surface, orienter means in said drum for orienting beans falling toward said openings with their longitudinal axes in a relatively transverse orientation with respect to said longitudinal axis of said drum to thereby tend to cause said ends of said beans to be more likely to be directed toward said openings, said orienter means comprising a plurality of discs located within said drum and oriented transversely to the longitudinal axis of said drum, an elongated shaft, mounting means for mounting said elongated shaft with its axis substantially parallel to and offset from said longitudinal axis of said drum, means mounting said discs in substantially parallel relationship on said shaft, first means for rotating said drum, and second means for rotating said shaft in the same direction as said drum, said discs being located proximate the downwardly moving part of said drum such that the beans are moved upwardly by said drum to be dropped through said discs.

2. A bean snipper as set forth in claim 1 wherein said discs are spaced from each other a distance which is less than the general length of beans being snipped.

3. A bean snipper as set forth in claim 1 wherein said means for rotating said shaft causes said shaft to rotate at an angular speed which is greater than the annular speed of said drum.

4. A bean snipper as set forth in claim 3 wherein said shaft is caused to rotate approximately three times the speed of said drum.

5. A bean snipper as set forth in claim 1 including a plurality of axially spaced annular rib members extending inwardly from said inner surface of said drum, and wherein the spacing between said discs and the spacing between said rib members is substantially the same.

6. A bean snipper as set forth in claim 9 wherein said discs and said rib members are in substantial coplanar relationship.

7. An orienter as set forth in claim 1 wherein said elongated shaft is mounted at a lower level than said axis of said drum and between said axis of said drum and the downwardly moving side of said drum.

8. An orienter as set forth in claim 7 wherein the diameter of said discs is less than about half of the diameter of said drum.

9. An orienter as set forth in claim 8 wherein the axis of said shaft lies in a plane which is at an angle of about 30° to the vertical and which passes through the axis of said drum.

10. An orienter for a device for treating elongated articles and having a generally horizontal annular drum with inner and outer surfaces and a longitudinal axis, openings in said drum of a size to receive the articles, orienter means in said drum for orienting the articles falling toward said openings with their longitudinal axes in a relatively transverse orientation with respect to said longitudinal axis of said drum to thereby tend to cause said ends of said articles to be more likely to be directed toward said openings, discs located within said drum and oriented transversely to the longitudinal axis of said drum, an elongated shaft, mounting means for mounting said elongated shaft with its axis substantially parallel to and offset from said longitudinal axis of said drum, means mounting said discs in substantially parallel relationship on said shaft, first means for rotating said drum, and second means for rotating said shaft in the same direction as said drum, said discs being located proximate the downwardly moving part of said drum such that the beans are moved upwardly by said drum to be dropped through said discs.

11. An orienter as set forth in claim 10 wherein said discs are spaced from each other a distance which is less than the general length of the articles.

12. An orienter as set forth in claim 10 wherein said means for rotating said shaft causes said shaft to rotate at an angular speed which is greater than the angular speed of said drum.

13. An orienter as set forth in claim 12 wherein said shaft is caused to rotate approximately three times the speed of said drum.

14. An orienter as set forth in claim 10 including a plurality of axially spaced annular rib members extending inwardly from said inner surface of said drum, and wherein the spacing between said discs and the spacing between said rib members is substantially the same.

15. An orienter as set forth in claim 14 wherein said discs and said rib members are in substantial coplanar relationship.

16. An orienter as set forth in claim 10 wherein said elongated shaft is mounted at a lower level than said axis of said drum and between said axis of said drum and the downwardly moving side of said drum.

17. An orienter as set forth in claim 16 wherein the diameter of said discs is less than about half of the diameter of said drum.

18. An orienter as set forth in claim 17 wherein the axis of said shaft lies in a plane which is at an angle of about 30° to the verticle and which passes through the axis of said drum.

* * * * *

UNITED STATES PATENT AND TRADEMARK OFFICE
CERTIFICATE OF CORRECTION

PATENT NO. : 4,213,383
DATED : July 22, 1980
INVENTOR(S) : Charles G. Burton

It is certified that error appears in the above-identified patent and that said Letters Patent are hereby corrected as shown below:

Column 7, line 52, (claim 6), change "claim 9" to --claim 5--.

Signed and Sealed this

Twenty-first Day of October 1980

[SEAL]

Attest:

SIDNEY A. DIAMOND

Attesting Officer

Commissioner of Patents and Trademark